UNITED STATES PATENT OFFICE.

MAX ENGELMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

PHARMACEUTICAL COMPOUNDS.

1,060,327.  Specification of Letters Patent.  Patented Apr. 29, 1913.

No Drawing.  Application filed October 4, 1910. Serial No. 585,304.

*To all whom it may concern:*

Be it known that I, MAX ENGELMANN, doctor of philosophy, chemist, citizen of the German Empire, residing at Elberfeld, Germany, have invented new and useful Improvements in Pharmaceutical Compounds, of which the following is a specification.

My application Serial No. 534325 relates to the preparation of easily soluble compounds derived from the ortho-oxy-mercuric compound of salicylic acid anhydrid (hydrargyrum salicylicum) which are prepared from the known ortho-oxy-mercuric salicylic acid anhydrid (hydrargyrum salicylicum of the *German Pharmacopœia*) by treating it with alkali and an amino acid or with the alkali salts of an amino acid. The same products result by at first treating the above mentioned anhydrids with alkalis and then treating the products thus obtained with amino fatty acids. I have now found that in this process other oxymercuric carboxylic acid compounds, especially oxymercuric carboxylic acids and their anhydrids can be used instead of the salicylate of mercuric oxid e. g. the oxymercuric benzoic acid anhydrid (see *Berichte der Deutschen Chemischen Gesellschaft* 35. p. 2870).

The new compounds thus obtained probably possess the following graphically represented constitution:

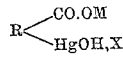

in which M stands for metal, X for an amino fatty acid and R for an aromatic nucleus, are whitish odorless compounds which are very easily soluble in water and insoluble in ether. They have proved to be valuable anti-syphilitica characterized by a mild action and as they are not irritating and not corrosive they are highly valuable for internal application especially for subcutaneous injection. They contain the mercury so firmly combined that on adding a diluted solution of caustic alkali or a cold solution of ammonium sulfid no precipitate is obtained. A solution of from 0.1-0.2 grams may be used for one subcutaneous injection.

In order to illustrate my new process more fully the following examples are given, the parts being by weight:

Example 1: 340 parts of the oxymercuric meta-oxybenzoic acid anhydrid (obtainable by heating equimolecular quantities of mercuric oxid and meta-oxybenzoic acid with water. The yellow mercuric oxid enters into solution and the resulting white product separates. It is filtered off.) are added to a solution of 89 parts of aminopropionic acid (alanin) in 1000 parts of normal NaOH. The resulting solution is filtered and the filtrate is evaporated *in vacuo*. A whitish crystalline compound separates in crystals. It can be purified by dissolving it in a small amount of water and reprecipitating it with alcohol. It is insoluble in alcohol, ether, benzene, acetone and chloroform, and is probably produced according to the following formula:

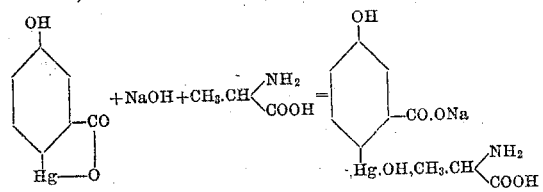

Example 2: 320 parts of the oxymercuric meta-oxybenzoic acid anhydrid (the same as described in Example 1) are added to a solution of 131 parts of asparagin in 1000 parts of normal NaOH. The solution is filtered and the filtrate is evaporated. The new compound separates in crystals. The whitish product is easily soluble in water, insoluble in alcohol, ether and benzene, and is probably produced according to the following formula:

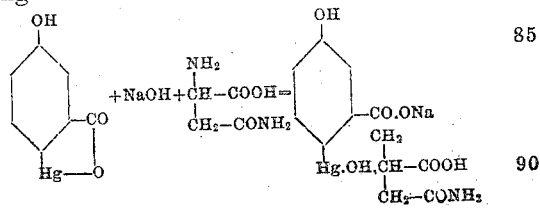

Other amino fatty acids e. g. aminooxybutyric acid, amino acetic acid, serin, leucin, sarcosin, tyrosin, etc., may be used or other oxymercuric carboxylic acids, e. g. oxymercuric naphthol carboxylic anhydrid, having most probably the formula:

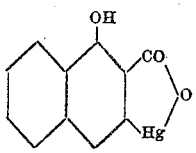

which is obtained by heating equimolecular quantities of mercuric acetate and alpha-naphthol carbonic acid with glacial acetic acid and filtering off the precipitate obtained, or oxymercuric salt of the sulfoanthranilic acid which can be obtained by heating acetyl-sulfo-anthranilic acid of the formula:

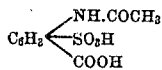

with HgO and glacial acetic acid and filtering off the precipitate, or oxymercuric-ortho-chlorobenzoic acid anhydrid having most probably the formula:

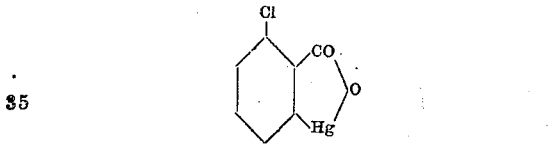

(which is obtained by heating together equimolecular quantities of HgO with ortho-chlorobenzoic acid to 130 to 140° C. After cooling the mass of the reaction is dissolved in dilute NaOH and the anhydrid is separated by introducing CO₂ into the solution.)

I claim:—

1. The new mercury compounds of the following graphically represented constitution

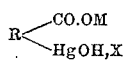

in which M stands for a metal, X for an amino acid, and R for an aromatic nucleus unsubstituted by hydroxyl in ortho position to the —CO— group, which new mercury compounds are whitish powders easily soluble in water and insoluble in ether, and containing the mercury so firmly combined that the aqueous solutions do not give any precipitate on the addition of dilute caustic soda lye or a cold solution of ammonium sulfid; and being valuable therapeutics, substantially as described.

2. The new mercury compounds of the following graphically represented constitution

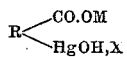

where M stands for metal, X for an amino acid, and R for an aromatic nucleus substituted in meta position to the —CO— group, which new mercury compounds are whitish powders easily soluble in water and insoluble in ether, and containing the mercury so firmly combined that the aqueous solutions do not give any precipitate on the addition of dilute caustic soda lye or a cold solution of ammonium sulfid; and being valuable therapeutics, substantially as described.

3. The new mercury compounds of the following graphically represented constitution

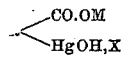

where M stands for a metal, X for an amino acid, and R for an aromatic nucleus substituted by —OH— in meta position to the —CO— group, which new mercury compounds are whitish powders easily soluble in water and insoluble in ether and containing the mercury so firmly combined that the aqueous solutions do not give any precipitate on the addition of dilute caustic soda lye or a cold solution of ammonium sulfid; and being valuable therapeutics, substantially as described.

4. The new mercury compounds of the following graphically represented constitution

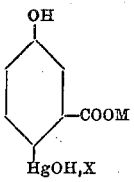

where M stands for a metal, and X for an amino acid, which new mercury compounds are whitish powders easily soluble in water and insoluble in ether, and containing the mercury so firmly combined that the aqueous solutions do not give any precipitate on the addition of dilute caustic soda lye or a cold solution of ammonium sulfid; and being valuable therapeutics, substantially as described.

5. The new mercury compound which has probably the formula:

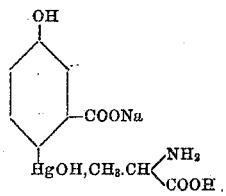

and is a whitish crystalline powder easily soluble in water and insoluble in alcohol, ether, acetone, benzol, chloroform, and contains the mercury so firmly combined that the aqueous solutions do not give any precipitate on the addition of dilute caustic soda lye or a cold solution of ammonium sulfid; and being valuable therapeutics, substantially as described.

In testimony whereof I have hereunto set my hand in the presence of two subscribing witnesses.

MAX ENGELMANN. [L. S.]

Witnesses:
CHAS. J. WRIGHT,
WALTER VONNEGUT.